(12) United States Patent
Maroney

(10) Patent No.: US 6,681,079 B1
(45) Date of Patent: Jan. 20, 2004

(54) OPTICAL FIBRE MONITORING SYSTEM

(75) Inventor: Andrew V Maroney, Winchester (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/573,235

(22) Filed: May 18, 2000

(51) Int. Cl.[7] .............................................. H04B 17/00
(52) U.S. Cl. ............................. 398/15; 398/13; 398/20
(58) Field of Search ................................ 359/110, 174, 359/177, 341.44; 356/73.1; 370/216–228; 379/1 T, 371; 398/13, 20, 21, 15

(56) References Cited

U.S. PATENT DOCUMENTS

| | | | | |
|---|---|---|---|---|
| 5,113,277 A | * | 5/1992 | Ozawa et al. ................ 359/127 |
| 5,355,250 A | * | 10/1994 | Grasso et al. ........... 359/341.44 |
| 5,491,572 A | * | 2/1996 | Ohara ........................... 398/15 |
| 5,859,725 A | * | 1/1999 | Sugiya et al. ........... 359/337.13 |
| 6,160,648 A | * | 12/2000 | Oberg et al. ................. 359/110 |
| 6,194,707 B1 | * | 2/2001 | Yang ........................ 250/227.15 |
| 6,222,668 B1 | * | 4/2001 | Dutrisac et al. ............. 359/337 |
| 6,243,195 B1 | * | 6/2001 | Pedersen et al. ............. 359/177 |
| 6,323,973 B1 | * | 11/2001 | Hongou ...................... 359/110 |
| 6,342,965 B1 | * | 1/2002 | Kinoshita .................... 359/334 |
| 6,344,915 B1 | * | 2/2002 | Alexander et al. .......... 359/177 |
| 6,359,708 B1 | * | 3/2002 | Goel et al. .................... 398/15 |
| 6,373,621 B1 | * | 4/2002 | Large et al. ................. 359/334 |
| 6,483,616 B1 | * | 11/2002 | Maddocks et al. .......... 359/110 |
| 6,504,630 B1 | * | 1/2003 | Czarnocha et al. ........... 398/15 |
| 2002/0109909 A1 | * | 8/2002 | Kinoshita ................. 359/341.1 |

FOREIGN PATENT DOCUMENTS

JP 06181015 A * 6/1994 .......... H01H/31/02

\* cited by examiner

Primary Examiner—Leslie Pascal
Assistant Examiner—Sherif R. Fahmy
(74) Attorney, Agent, or Firm—Barnes & Thornburg

(57) ABSTRACT

The present invention provides a method of monitoring a transmission fiber including the steps of transmitting a monitor signal on the transmission fiber in a direction opposite to the propagation of traffic signals on the transmission fiber, at an optical amplifier connected to the transmission fiber detecting the monitor signal and automatically shutting down the optical amplifier in response to a predetermined change in the detected monitor signal. The invention facilitates a faster shut down of amplifiers when a fault occurs than is currently available because it shuts down the amplifier feeding directly into the area of broken fiber first rather than last as in conventional communication systems.

13 Claims, 3 Drawing Sheets

OPTICAL FIBRE MONITORING SYSTEM

FIELD OF THE INVENTION

The present invention relates to a method and apparatus for monitoring a transmission fibre for damage, and in particular, one in which a loss of signal between two adjacent amplifiers in a transmission path leads to an automatic shut down of the amplifiers.

BACKGROUND TO THE INVENTION

Optical networks typically employ a number of optical fibre amplifiers to restore optical signal levels at intervals along a transmission path. As the requirement for optical signal power increases, for example to cope with the ever increasing demand for additional channels and/or long haul communication links, so the output power of optical lasers must increase. This presents a potential safety hazard in the event of a fibre break since individuals could then be exposed to harmful levels of radiation.

Recommendations are being developed that define how a network operator must respond to automatically power down line amplifiers. In one such ITU Recommendation (G.664), optical amplifiers are automatically shut down in the absence of an optical signal at an optical input of the amplifier, which would occur in the event of a fibre break. Recommendation G.664 proposes that systems use a form of loss of signal monitoring which is responsive to shut down an amplifier when a traffic signal is lost at the amplifier input. This means that to shut down the two amplifiers nearest to the break, the loss of signal must propagate completely around a loop provided by a pair of optical fibres between two remote terminals before the amplifier up-stream of the break is shut down. This can take several seconds and the delay presents a potential safety hazard. The delay can be particularly long for long haul links. In addition, faults which develop in a fibre can cause an effect termed a "fibre fuse" in which the fibre core reaches a very high temperature. Since fibre fuse damage can travel at tens of meters per second any delay in shutting down the amplifier can lead to the destruction of long lengths of optical fibre. Should the fibre fuse reach an optical amplifier a great deal of damage can be done to the device.

SUMMARY OF THE INVENTION

According to a first aspect of the present invention, a method of monitoring a transmission fibre includes the steps of:
- transmitting a monitor signal on the transmission fibre in a direction opposite to the propagation of traffic signals on the transmission fibre;
- at an optical amplifier connected to the transmission fibre, detecting the monitor signal; and,
- automatically shutting down the optical amplifier in response to a predetermined change in the detected monitor signal.

According to a second aspect of the present invention, an optical amplifier comprises a signal monitoring circuit coupled to an output of the optical amplifier to detect a backward propagating monitor signal, the signal monitoring circuit having a shut down circuit which automatically shuts down the optical amplifier in response to a predetermined change in the backward propagating monitor signal detected by the signal monitoring circuit.

The present invention facilitates a faster shut down of amplifiers than is currently available because it shuts down the amplifier feeding directly into the area of broken fibre first rather than last. This is important for safety reasons but, in addition, in the case of the high power levels expected in future systems, it will limit the damage caused by fibre fuses, a symptom of high power levels in optical fibres. The faster the amplifier shut down, the less damage is caused to the transmission fibre, reducing repair costs, and potentially saving equipment connected to the fibre. Since the fibre fuse damage track can travel at tens of meters per second any improvement in response time will limit the amount of damage caused.

The monitor signal may be intermittent or continuous, and preferably it is the absence of a detected monitor signal that triggers an automatic shut down of the optical amplifier.

Preferably, the monitor signal is generated by an optical source at an optical amplifier, the optical source being coupled for backward transmission of light on the transmission fibre.

More preferably, the monitor signal is Raman pump radiation generated at an optical amplifier. The Raman pump is launched backwards up the transmission fibre to provide Raman amplification within the transmission fibre and some will reach the preceding optical amplifier. The preceding optical amplifier monitors this backwards traveling Raman pump radiation and looks for a loss in this signal. If a loss is detected the amplifier shuts itself down, making the transmission fibre safe, and in the case of a fibre fuse, limiting the amount of fibre that needs to be replaced.

In the preferred embodiment, the output of the optical amplifier is fitted with a tap coupler and a monitoring photodiode connected to a shut down on the amplifier. The amplifier also has a distributed Raman pump which is coupled to counter pump the transmission fibre to provide Raman amplification within the transmission fibre between optical amplifiers.

BRIEF DESCRIPTION OF THE DRAWINGS

An example of the present invention will now be described in detail with reference to the accompanying drawings, in which.

DETAILED DESCRIPTION

Figure 1:
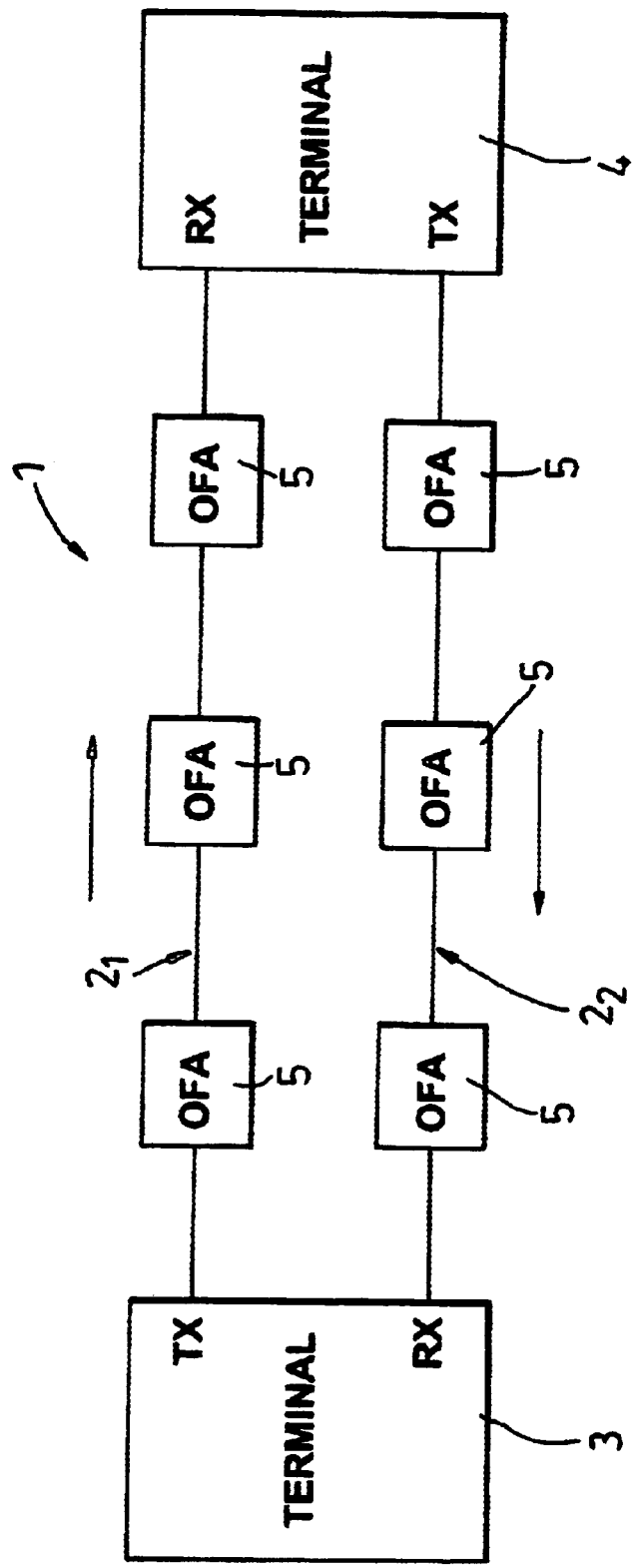
FIG. 1 is a schematic representation of an optical network having a concatenated chain of optical amplifiers.

FIG. 1 shows a schematic representation of an optical network 1 having a pair of optical fibres 2 connecting two remote terminals 3 and 4. Each fibre in the fibre pair 2 includes a concatenated chain of optical fibre amplifiers 5 which provide optical restoration at intervals (typically between 100 and 120 km) along the respective transmission paths. As will be explained below, each optical amplifier 5 includes a signal monitoring circuit having a shut down circuit which monitors both an optical input and an optical output in order to shut down the optical amplifier automatically in the event of fibre damage that causes a loss of signal between two adjacent optical amplifiers 5.

Figure 2:
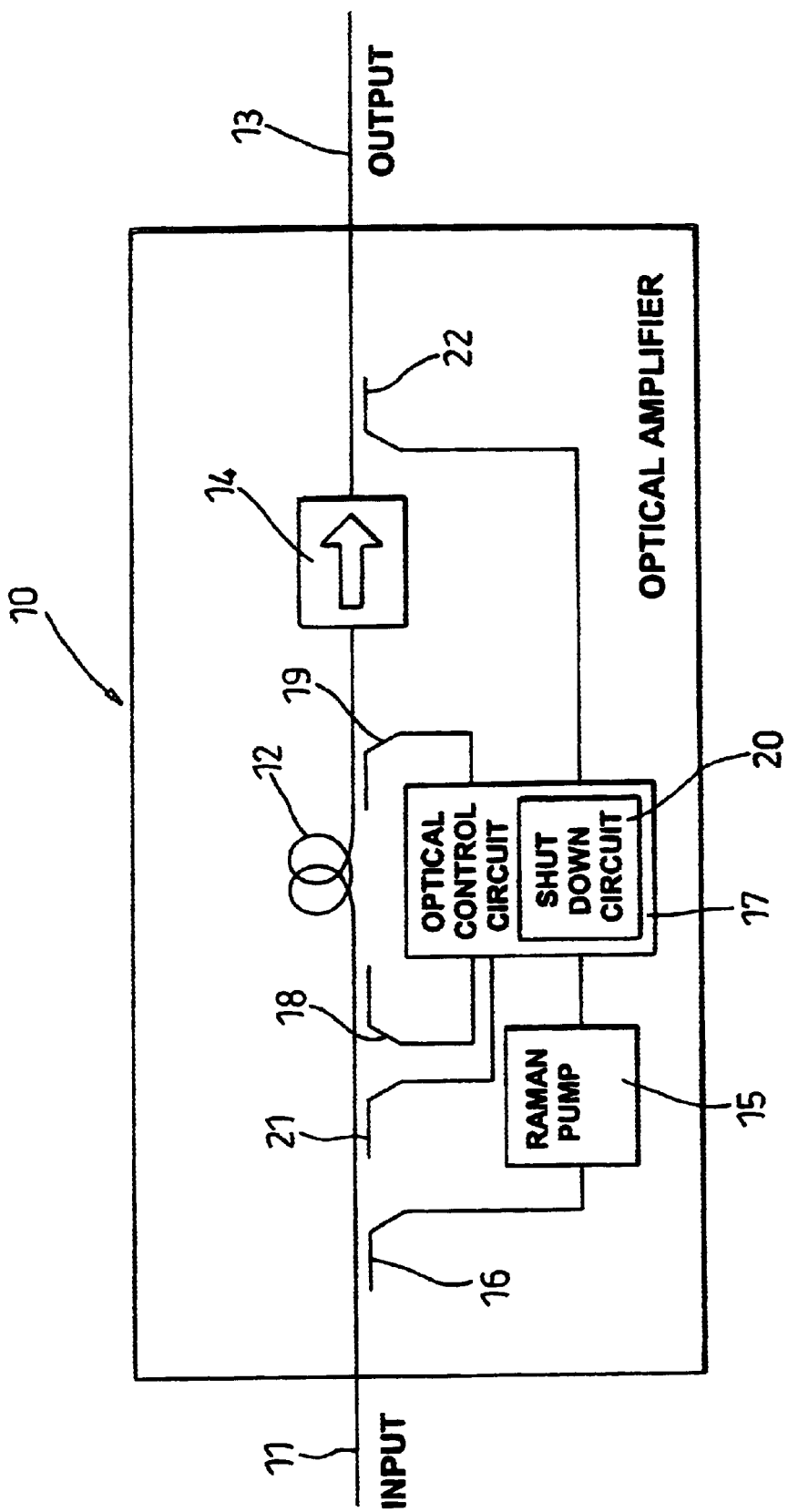
FIG. 2 is an example of an optical amplifier in accordance with the present invention, incorporating a transmission fibre monitor; and, FIG. 3 is a more detailed view of an optical amplifier control circuit shown in FIG. 2.

FIG. 2 shows an example of an optical amplifier 10 suitable for use in the system of FIG. 1. The optical amplifier 10 receives an optical signal on a transmission fibre at an optical input 11 which is subsequently amplified by a suitably pumped fibre amplifier 12, for example and erbium doped fibre amplifier (EDFA). The EDFA 12 is coupled to an optical output 13 via an optical isolator 14. The optical isolator 14 prevents backward scattered in-band signals being coupled back into the EDFA 12.

The optical amplifier 10 also includes a distributed Raman pump 15 which is arranged to launch pump radiation backwards along the transmission fibre via an optical coupler 16 at the optical input 11 to provide Raman amplification within the transmission fibre. Some pump radiation will reach the optical output of a preceding optical amplifier (not shown) in the network, thereby establishing a suitable monitor signal indicative of the integrity of the transmission fibre.

The optical amplifier 10 also includes an optical control circuit 17 that provides the necessary pump signals used to co-pump and/or counter-pump the EDFA 12 via optical couplers 18 and 19. The optical control circuit 17 also includes a shut down circuit 20 (described in detail below) which receives signals from an optical coupler 21 and an optical coupler 22 positioned at the optical input 11 and optical output 13, respectively. The coupler 22 is a wavelength selective tap coupler that couples backward propagating out-of-band signals received at the optical output 13 to the shut down circuit 20. The tap coupler 22 can be designed to be wavelength selective or a separate filter (not shown) may be provided for this purpose. In this example, the signal detected is residual Raman pump radiation transmitted by a similar optical amplifier (not shown) located downstream. The wavelength of the residual Raman pump radiation depends on the characteristics of the amplifier in question, for example, for a C-band (1530 to 1565 nanometers) amplifier a wavelength between 1410 and 1450 nanometers is appropriate, whereas for an L-band (1570 to 1610 nanometers) amplifier, a wavelength between 1450 and 1500 nanometers is appropriate. In addition, for amplifiers operating in the S-band, residual Raman pump radiation between 1380 and 1410 manometers would be appropriate.

If there is a detected loss of either the traffic signal at optical coupler 21 (indicating fibre damage upstream) or the monitor signal at optical coupler 22 (suggesting fibre damage downstream) the shut down circuit 20 is responsive to shut down the optical amplifier. In particular, the pump sources within the optical amplifier device, including the distributed Raman pump 15, are shut down thereby making the transmission fibre safe. In the case of a fibre fuse, this action limits the amount of fibre that needs to be replaced.

The design facilitates a faster shut down of optical amplifiers than is currently available because it automatically shuts down an optical amplifier feeding directly into the area of broken fibre first rather than last. In this example, the monitor signal detected at the optical output of the optical amplifier 10 is residual Raman pump radiation transmitted by a downstream optical amplifier. In a distributed Raman pump system, only one wavelength need be monitored at the optical amplifier. Alternatively, an additional light source (such as a light emitting diode or laser diode) at a different wavelength could provide a monitor signal. Where fibre lasers are used, other wavelengths can be tapped off to provide a monitor signal. The only constraint on the wavelength of the monitor signal is that is must remain out of the signal band.

Figure 3:
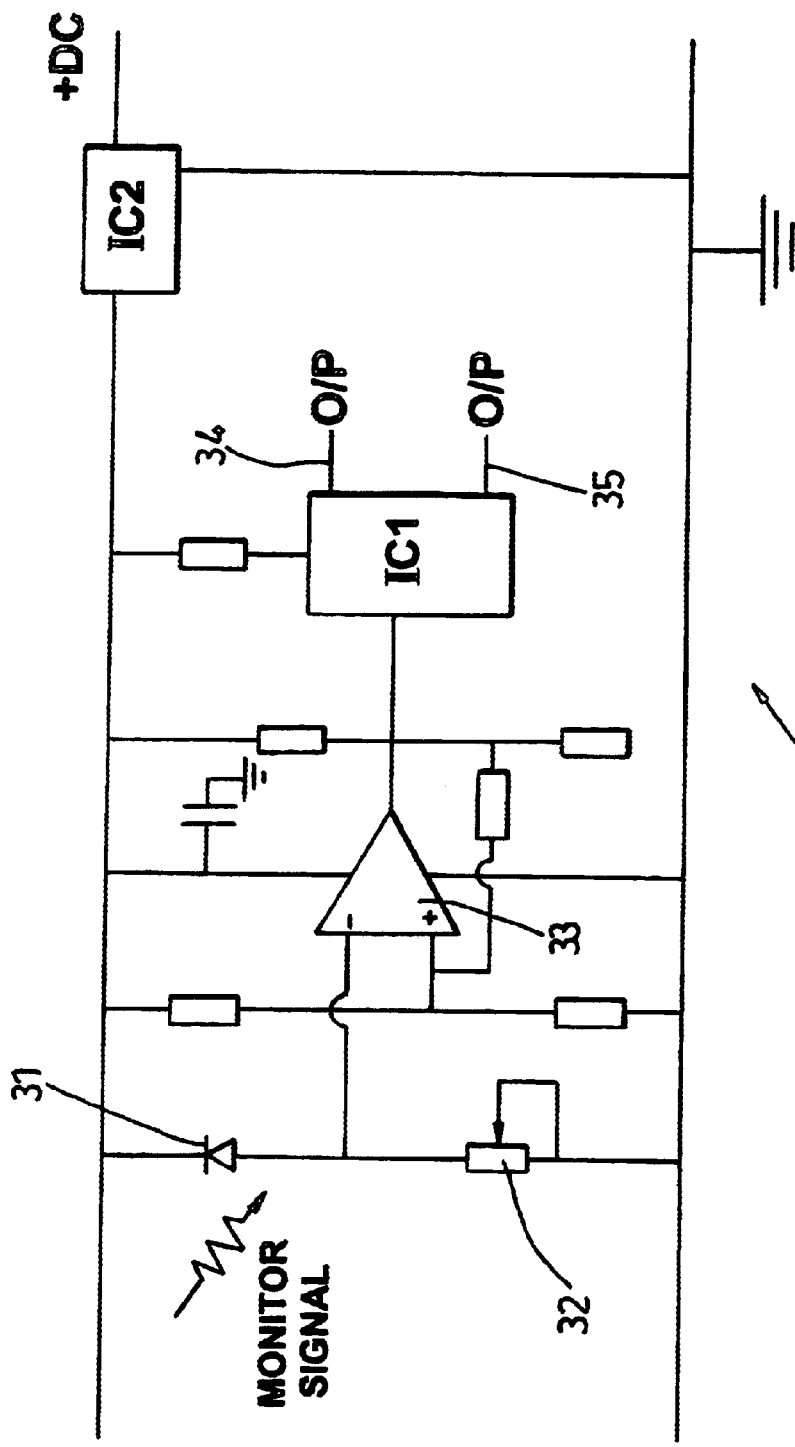

FIG. 3 shows a more detailed example of an electrical circuit 30 forming part of the optical shut down circuit 20 within the optical amplifier 10 of FIG. 2. The circuit 30 is responsive to a loss of monitor signal i.e., residual Raman pump radiation. A similar device would be required to shut down the optical amplifier the event of a detected loss of the traffic signal. The monitor signal coupled from the optical output 13 of the optical amplifier 10 in FIG. 2 is fed to a photodiode 31 that converts the detected light into an electrical signal. The threshold of the photodiode 31 is set by a variable resistor 32, and this provides an input to an operational amplifier 33 which is configured to close a switch within an integrated circuit IC1 if light above the threshold is detected at the photodiode 30. The integrated circuit IC1 has a number of outputs 34 and 35 connected to the pump sources (not shown) within the optical amplifier 10. Should the detected monitor signal fall below the threshold of the photodiode 31, the switch within the integrated circuit IC1 opens, thereby changing the signal at the outputs 34 and 35. This change of switch state disables pump sources connected to the outputs 34 and 35 of the shut down circuit 20. Another integrated circuit IC2 is provided as a power controller which serves to stabilise the top rail DC supply voltage.

We claim:

1. A method of monitoring a transmission fibre including the steps of:

transmitting a monitor signal on the transmission fibre in a direction opposite to the propagation of traffic signals on the transmission fibre;

at an optical amplifier connected to the transmission fibre, detecting the monitor signal; and, automatically shutting down the optical amplifier in response to a predetermined change in the detected monitor signal.

2. A method according to claim 1, in which the monitor signal is generated by an optical source at a remote optical amplifier, the optical source being coupled for backward transmission of light on the transmission fibre.

3. A method according to claim 1, in which the transmitted monitor signal is continuous.

4. A method according to claim 1, in which the absence of a detected monitor signal triggers the shutdown of the optical amplifier.

5. A method according to claim 1, in which the monitor signal is residual Raman pump radiation generated at a remote optical amplifier.

6. A method according to claim 1, in which the optical amplifier is shut down by switching off optical sources within the optical amplifier.

7. An optical amplifier comprising a signal monitoring circuit coupled to an output of the optical amplifier to detect a backward propagating monitor signal, the signal monitoring circuit having a shut down circuit which automatically shuts down the optical amplifier in response to a predetermined change in the backward propagating monitor signal detected by the signal monitoring circuit.

8. An amplifier according to claim 7, comprising an optical coupler for coupling the monitor signal to the signal monitoring circuit.

9. An amplifier according to claim 7, in which the shut down circuit comprises a switching circuit coupled to a number of optical sources within the optical amplifier, wherein a change in switch state causes the shutdown of the optical sources.

10. An amplifier according to claim 9, in which the switching circuit receives the detected monitor signal and is responsive to a loss of the detected monitor signal to trigger a change in switch state.

11. An amplifier according to claim 7, further comprising a traffic signal monitoring circuit coupled to an input of the optical amplifier to detect traffic signals, the traffic signal monitoring circuit having a shutdown circuit which automatically shuts down the optical amplifier in response to a predetermined change in the traffic signal detected by the traffic signal monitoring circuit.

12. An optical communications system comprising a transmission fibre having a plurality of optical amplifiers arranged to amplify traffic signals carried by the transmission fibre, wherein at least one optical amplifier includes a signal monitoring circuit coupled to an output of the optical amplifier to detect a backward propagating monitor signal, the signal monitoring circuit having a shut down circuit which automatically shuts down the optical amplifier in response to a predetermined change in the backward propagating monitor signal detected by the signal monitoring circuit.

13. An optical communications system according to claim 12, in which at least one optical amplifier includes a traffic signal monitoring circuit coupled to an input of the optical amplifier to detect traffic signals, the traffic signal monitoring circuit having a shutdown circuit which automatically shuts down the optical amplifier in response to a predetermined change in the traffic signal detected by the traffic signal monitoring circuit.

* * * * *